United States Patent [19]

Koga

[11] Patent Number: 5,784,491
[45] Date of Patent: Jul. 21, 1998

[54] METHOD AND APPARATUS FOR CODING AND DECODING IMAGE DATA USING VECTOR QUANTIZATION

[75] Inventor: Yuzuru Koga, Kawasaki, Japan

[73] Assignee: Fujitsu Limited, Kawasaki, Japan

[21] Appl. No.: 391,566

[22] Filed: Feb. 21, 1995

[30]  Foreign Application Priority Data

Feb. 18, 1994 [JP] Japan .................................. 6-021301

[51] Int. Cl.⁶ .............................. G06K 9/00; G06K 9/36; G06K 9/40; G06K 9/46
[52] U.S. Cl. .......................... 382/232; 348/405; 348/414; 348/422; 358/418; 358/426; 358/518; 364/518; 375/34; 375/122; 375/243; 380/10; 382/166; 382/236; 382/275; 382/132
[58] Field of Search ..................... 382/275, 132, 382/166, 236, 232; 358/133, 80, 135, 136, 426, 418; 381/36; 375/122, 34, 243; 348/405, 422, 414, 384; 364/518; 380/10; 395/410

[56]  References Cited

U.S. PATENT DOCUMENTS 4,933,761  6/1990  Murakami et al. ..................... 358/133
5,101,486  3/1992  Okamoto .............................. 395/410
5,341,441  8/1994  Maeda et al. ......................... 382/56
5,450,132  9/1995  Harris et al. ......................... 348/418

*Primary Examiner*—Leo H. Boudreau
*Assistant Examiner*—Daniel G. Mariam
*Attorney, Agent, or Firm*—Staas & Halsey

[57]  ABSTRACT

An image is vector-quantized into coded data, which is stored in a storage device. The coded data is read out of the storage device and is decoded. The decoded data may cause an overflow due to a vector quantization error. If every piece of coded data is checked for an overflow when it is decoding, a large number of processes must be carried which extends the decoding time. To solve this problem, each piece of coded data is once decoded in the vector quantization stage, to determine whether or not the coded data causes an overflow. If it is determined that it causes an overflow, the coded data is provided with exception judging information indicating that an exceptional overflow process must be carried out when decoding the coded data. As a result, the exceptional overflow process is carried out only when required in a decoding stage, to shorten a decoding time.

18 Claims, 11 Drawing Sheets

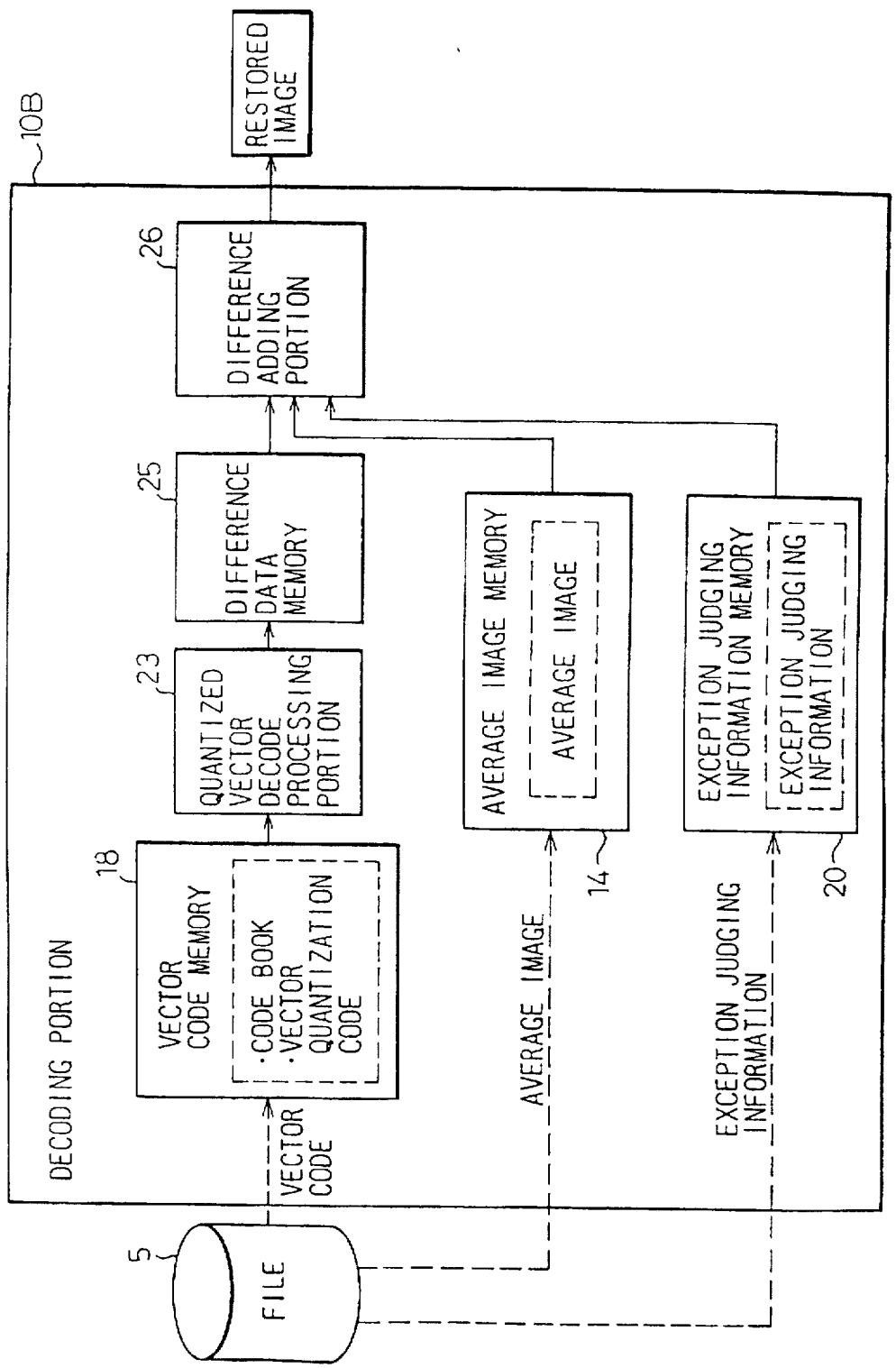

Fig. 4A
![](Fig. 4A pixel grid with cells a,b,c,d on top row and e,f,g,h on second row)
Fig. 4B        Fig. 4C
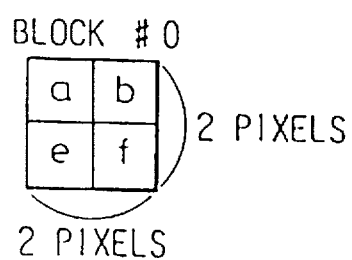
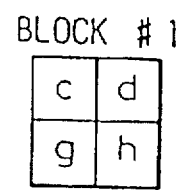

Fig.5A
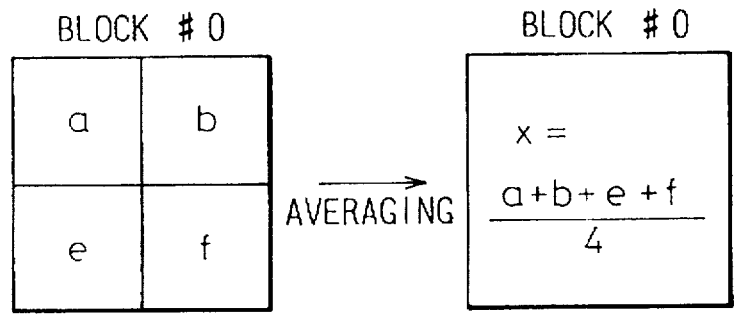
Fig.5B
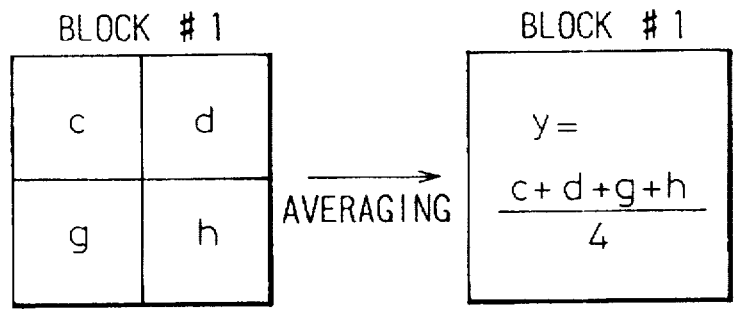
Fig.5C   Fig.5D
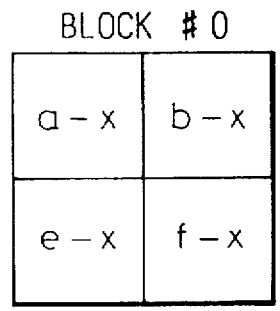
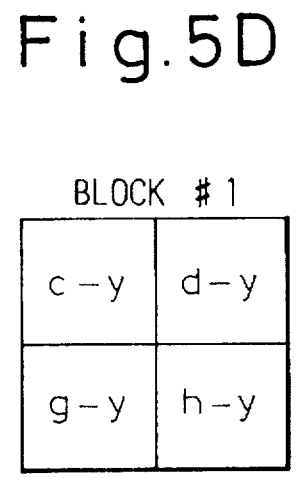

Fig.7A
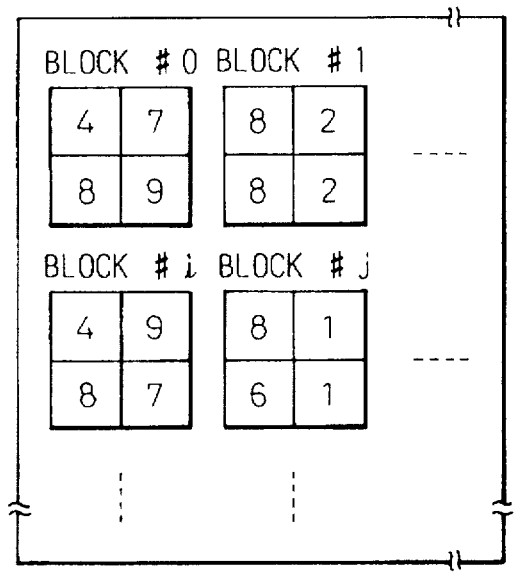
Fig.7B
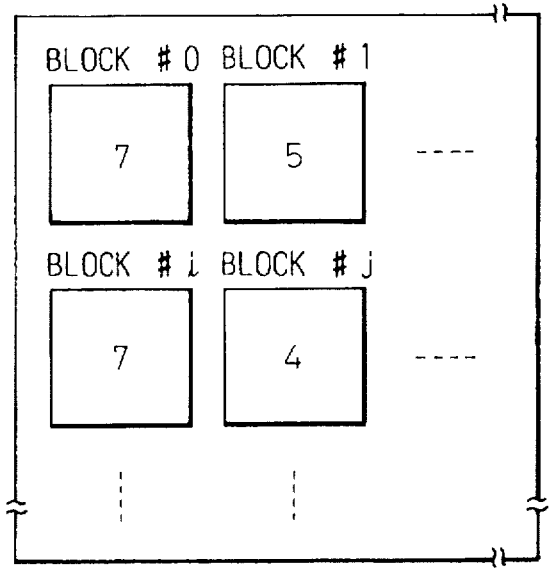
Fig.7C
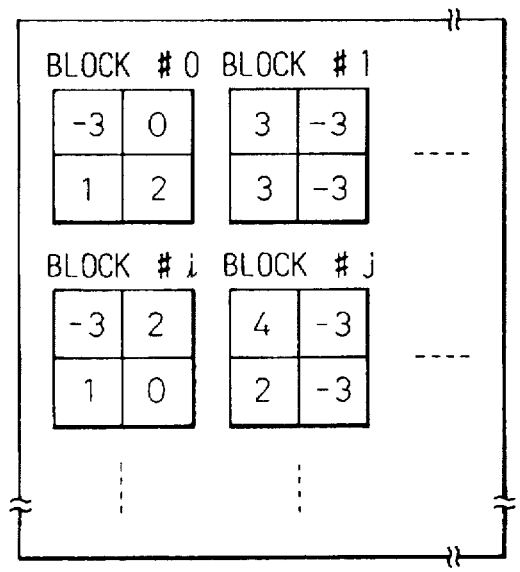
Fig.7D
| CODE BOOK ||
| QUANTIZATION CODE | REPRESENTATIVE VECTOR |
|---|---|
| K0 | a0, b0, c0, d0<br>$\begin{array}{\|c\|c\|}\hline -3 & 1 \\\hline 1 & 1 \\\hline\end{array}$ |
| K1 | a1, b1, c1, d1<br>$\begin{array}{\|c\|c\|}\hline 4 & -3 \\\hline 3 & -3 \\\hline\end{array}$ |
| ⋮ | ⋮ |

| CODE BOOK | |
|---|---|
| QUANTIZATION CODE | REPRESENTATIVE VECTOR |
| K0 | a0 b0 c0 d0 |
| K1 | a1 b1 c1 d1 |
| K2 | a2 b2 c2 d2 |
| ⋮ | ⋮ |
| Kn | an bn cn dn | ns
METHOD AND APPARATUS FOR CODING AND DECODING IMAGE DATA USING VECTOR QUANTIZATION

BACKGROUND OF THE INVENTION

1. Field of the Invention

The present invention relates to a method of, and an apparatus for, coding and decoding an image by using vector quantization. In particular, the present invention relates to a method of, and an apparatus for, employing vector quantization to code, compress, and decode a static or dynamic image in a personal or office computer.

2. Description of the Related Art

Computers frequently handle static or dynamic images. Image data is usually greater than character data in quantity. Accordingly, the computers must employ a technique to compress image data, to speedily process the image data.

To code, compress, and decode image data, computers use a coding-decoding apparatus with a vector quantization technique. The coding-decoding apparatus has a coding portion for coding an original image and a decoding portion for decoding the coded image. The coding portion has an original image memory for storing the original image, a dividing portion for dividing the original image into blocks, and a vector quantization portion.

The dividing portion divides the original image stored in the original image memory into blocks. The vector quantization portion vector-quantizes each of the blocks according to a code book and provides coded data.

The decoding portion has a quantized vector decoding portion, which decodes the coded data according to quantization codes, to restore the original image.

The conventional coding-decoding apparatus has the following problems:

(1) The apparatus directly codes an original image by using vector quantization. Accordingly, the apparatus must handle a large amount of data and requires a long coding and decoding time.

(2) The apparatus vector-quantizes an original image according to a code book prepared in advance. The code book may provide improper quantization codes when handling a large quantity of data, and may thus deteriorate the quality of a restored image.

(3) To shorten the coding and decoding time, the quantity of data to be processed must be reduced. Reducing the quantity of data, however, deteriorates the quality of a restored image.

A decoding operation is more frequently carried out than a compressing operation. Accordingly, the long decoding time and poor image quality are problems in the prior art. It is important to speedily decode a coded image and restore a high-quality image even if the compression time and the compression ratio are sacrificed.

SUMMARY OF THE INVENTION

An object of the present invention is to provide a method of, and an apparatus for, coding and decoding an image, capable of reducing the quantity of data to process, speedily processing the data, and restoring a high-quality image.

Another object of the present invention is to provide a method of, and an apparatus for, coding and decoding an image. The apparatus decodes, during a coding stage, a coded image, and adds exception judging information to the coded image if the decoded image causes an overflow. The exception judging information is used during the decoding stage to speedily decode the coded image and secure the quality of a restored image.

In order to accomplish the objects, the present invention provides a method of coding an image by using vector quantization. The method divides an original image into blocks each containing a predetermined number of pixels. For each of the blocks, the method calculates an average of the values of pixels contained in the block, to provide an average image of the block, finds the differences between the average image and the pixels, and vector-quantizes the differences, to provide a vector quantization code for the block. During this coding stage for each block, the method restores the original image of the block according to the vector quantization code and average image of the block and determines if the restored image causes an overflow. If it causes an overflow, the method adds exception judging information to the vector quantization code of the block, to indicate that an exceptional overflow process must, be carried out when decoding the block. The coded data of each block includes, therefore, an average image, a vector quantization code, and exception judging information.

When vector-quantizing a given block, the differences between an average image of the block and pixels contained in the block serve as the elements of a vector. Like vectors are represented with the same vector quantization code. The vector quantization codes and corresponding data form a code book.

The present invention provides a method of decoding coded data. The method finds the difference between an original image and an average image according to a vector quantization code contained in the coded data and adds the difference to the average image to restore an original image.

This method carries out an exceptional overflow process only when exception judging information contained in the coded data indicates that the process is needed. Instead of the average image, a reference image may be used when coding and decoding an image. The reference image reduces the quantity of data to be coded without deteriorating the quality of a restored image, to thereby improve the processing speed.

The present invention provides an apparatus for coding an image by using vector quantization. The apparatus has an averaging portion, a difference extraction portion, a vector quantization portion, an exception judgement portion, and an output operation portion. The apparatus divides an original image into blocks each containing a predetermined number of pixels. For each of the blocks, the averaging portion calculates an average of the values of pixels contained in the block, to provide an average image of the block, the difference extraction portion finds the differences between the average image and the pixels, and the vector quantization portion vector-quantizes the differences, to provide a vector quantization code for the block. The exception judgement portion restores the original image of each block according to the vector quantization code and the average image of the block and determines if the restored image causes an overflow. According to a result of the determination, the exception judgement portion adds exception judging information to the vector quantization code of the block, to indicate whether or not an exceptional overflow process must be carried out when decoding the block. The output operation portion provides the coded data of each block.

The present invention also provides an apparatus for decoding coded data. The apparatus has a quantized vector processing portion and a difference adding portion. The quantized vector processing portion finds the difference between an original image and an average image according to a vector quantization code contained in the coded data, and the difference adding portion adds the difference to the average image, to restore the original image. During this decoding operation, exception judging information contained in the coded data is used to determine whether or not an exception overflow process must be carried out.

BRIEF DESCRIPTION OF THE DRAWINGS

The present invention will be more clearly understood from the description set forth below with reference to the accompanying drawings, wherein:

FIG. 3B is a block diagram showing a decoding portion of the apparatus of FIG. 2;

FIG. 4A is an enlarged view showing a part of an original monochrome image provided to the coding portion of FIG. 3A;

FIG. 4B shows a block consisting of four pixels in the image of FIG. 4A;

FIG. 4C shows another block consisting of four pixels in the image of FIG. 4A;

FIG. 5A shows the processes of averaging the pixels of the block of FIG. 4B and forming an average image of the block;

FIG. 5B shows processes of averaging the pixels of the block of FIG. 4C and forming an average image of the block;

FIG. 5C shows the difference between each pixel in the block of FIG. 4B and the average image of FIG. 5A;

FIG. 5D shows the difference between each pixel in the block of FIG. 4C and the average image of FIG. 5B;

FIG. 7A is a block diagram showing examples of the luminance levels of 16 pixels of an original monochrome image divided into four blocks;

FIG. 7B is a block diagram showing the average images of the blocks of FIG. 7A;

FIG. 7C is a block diagram showing the difference between each pixel of each block of FIG. 7A and the average image of the block;

FIG. 7D shows a code book of quantization codes and corresponding representative vectors, prepared according to the blocks of FIG. 7C;

DESCRIPTION OF THE PREFERRED EMBODIMENTS

Figure 1:
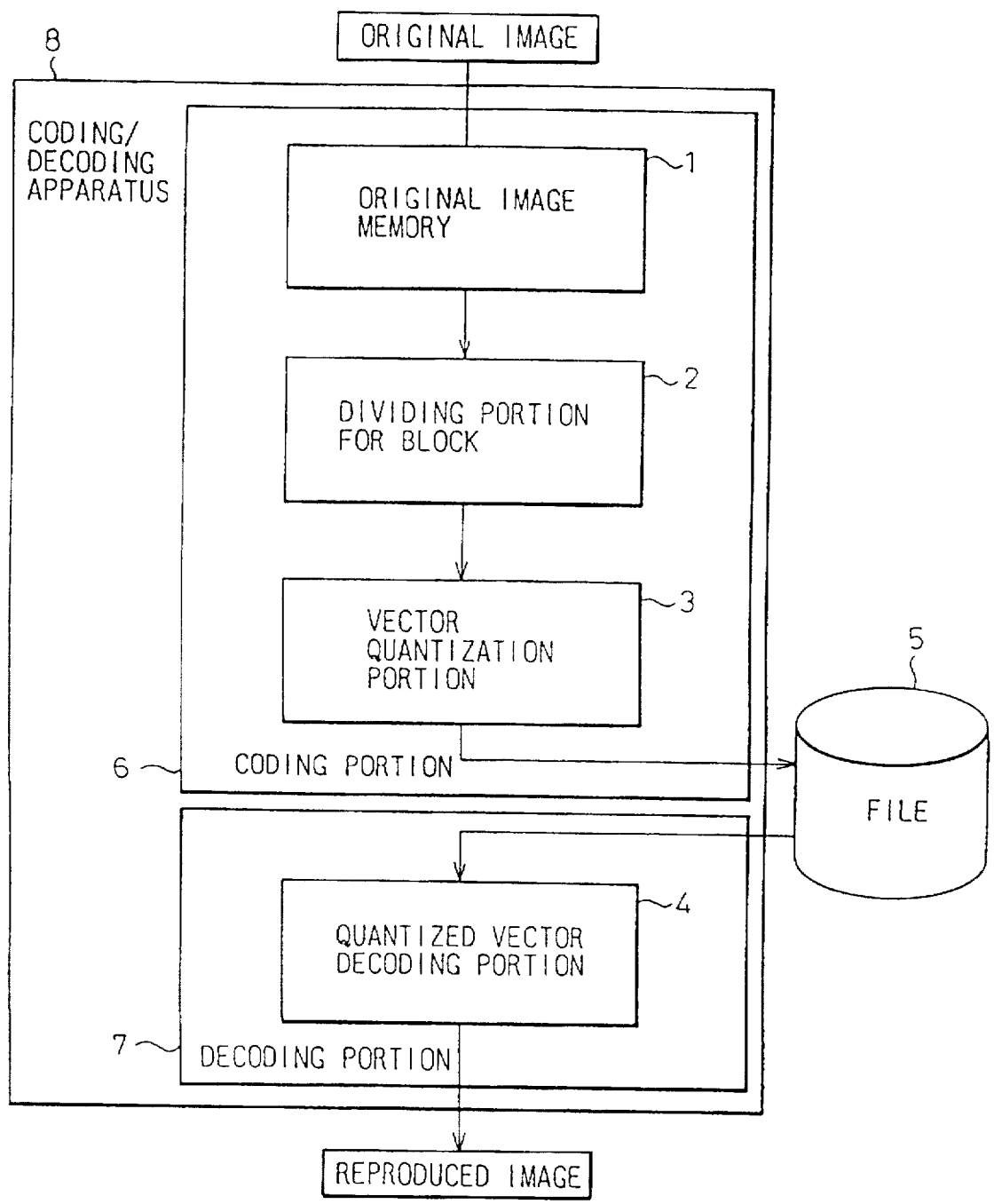
FIG. 1 is a block diagram showing a coding-decoding apparatus according to a prior art.

Before describing the preferred embodiments, an explanation will be given of the conventional apparatus for coding and decoding an image by using vector quantization with reference to FIG. 1.

The coding-decoding apparatus 8 of the prior art has a coding portion 6 and a decoding portion 7. The coding portion 6 has an original image memory 1, a dividing portion 2, and a vector quantization portion 3. The decoding portion 7 has a quantized vector decoding portion 4.

The apparatus 8 receives an original image from a personal computer or an office computer. The original image is stored in the memory 1. The dividing portion 2 divides the original memory into blocks each consisting of, for example, "n×n" pixels. The blocks are sent to the vector quantization portion 3.

The vector quantization portion 3 vector-quantizes each block and provides coded data for each block according to a code book prepared in advance. The coded data are stored in a file 5.

The quantized vector decoding portion 4 of the decoding portion 7 reads coded data out of the file 5 and decodes the same into an image.

The apparatus 8 of the prior art directly vector-quantizes an original image. Accordingly, the apparatus 8 must handle a large quantity of data and the coding and decoding times are long. In addition, the apparatus 8 must use a prepared code book for vector quantization, which may provide improper codes when handling a large quantity of data, to deteriorate the quality of a restored image. To shorten the data processing time, the quantity of data to be processes must be reduced. Reducing the quantity of data, however, deteriorates the quality of the restored image.

Figure 2:
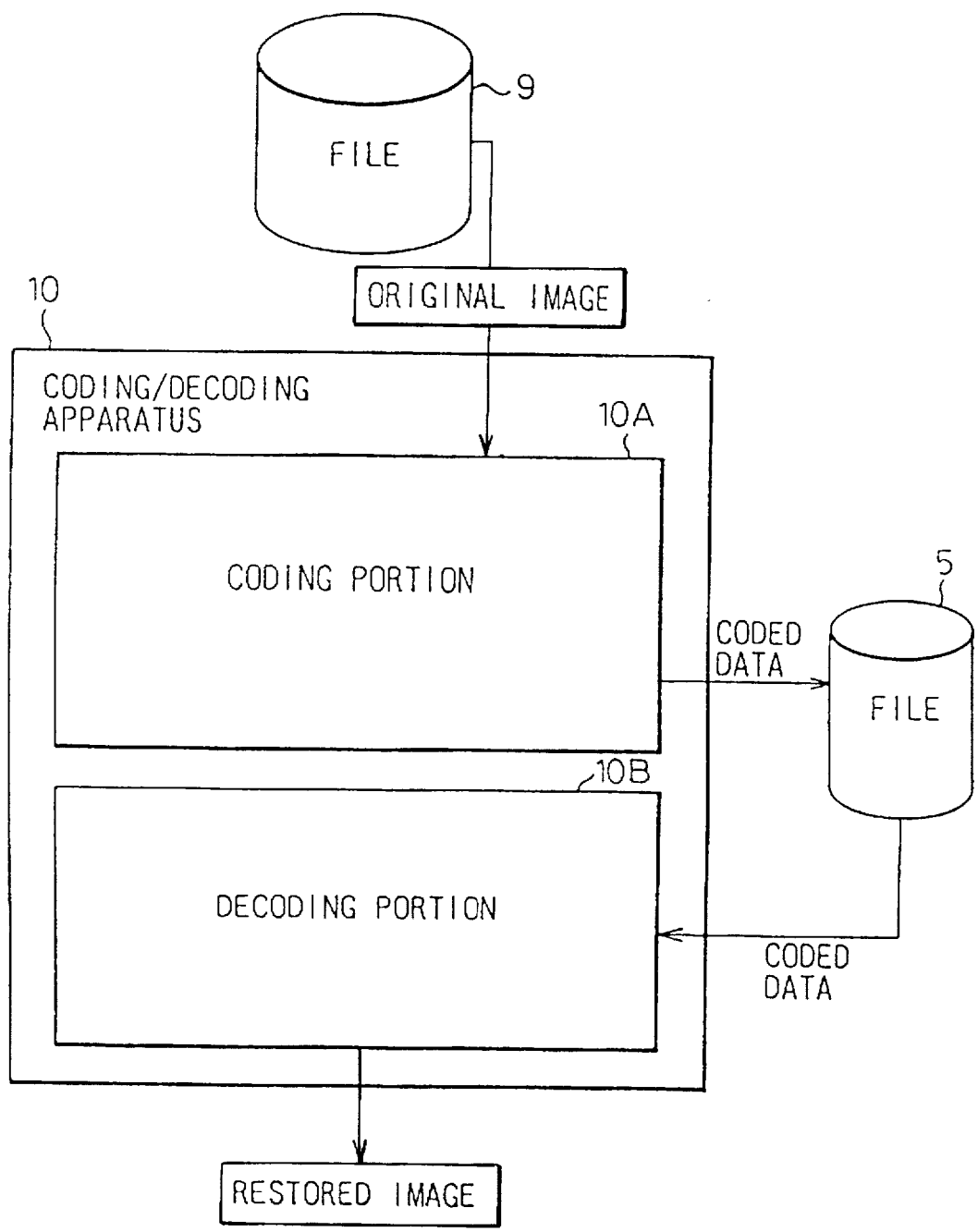
FIG. 2 is a block diagram showing a coding-decoding apparatus according to an embodiment of the present invention.

FIG. 2 is a block diagram showing a coding-decoding apparatus 10 according to an embodiment of the present invention. The apparatus 10 reads an original image from a file 9. The original image is coded by a coding portion 10A and is stored in another file 5. A decoding portion 10B of the apparatus 10 reads coded data out of the file 5 and decodes the same into an image.

Figure 3A:
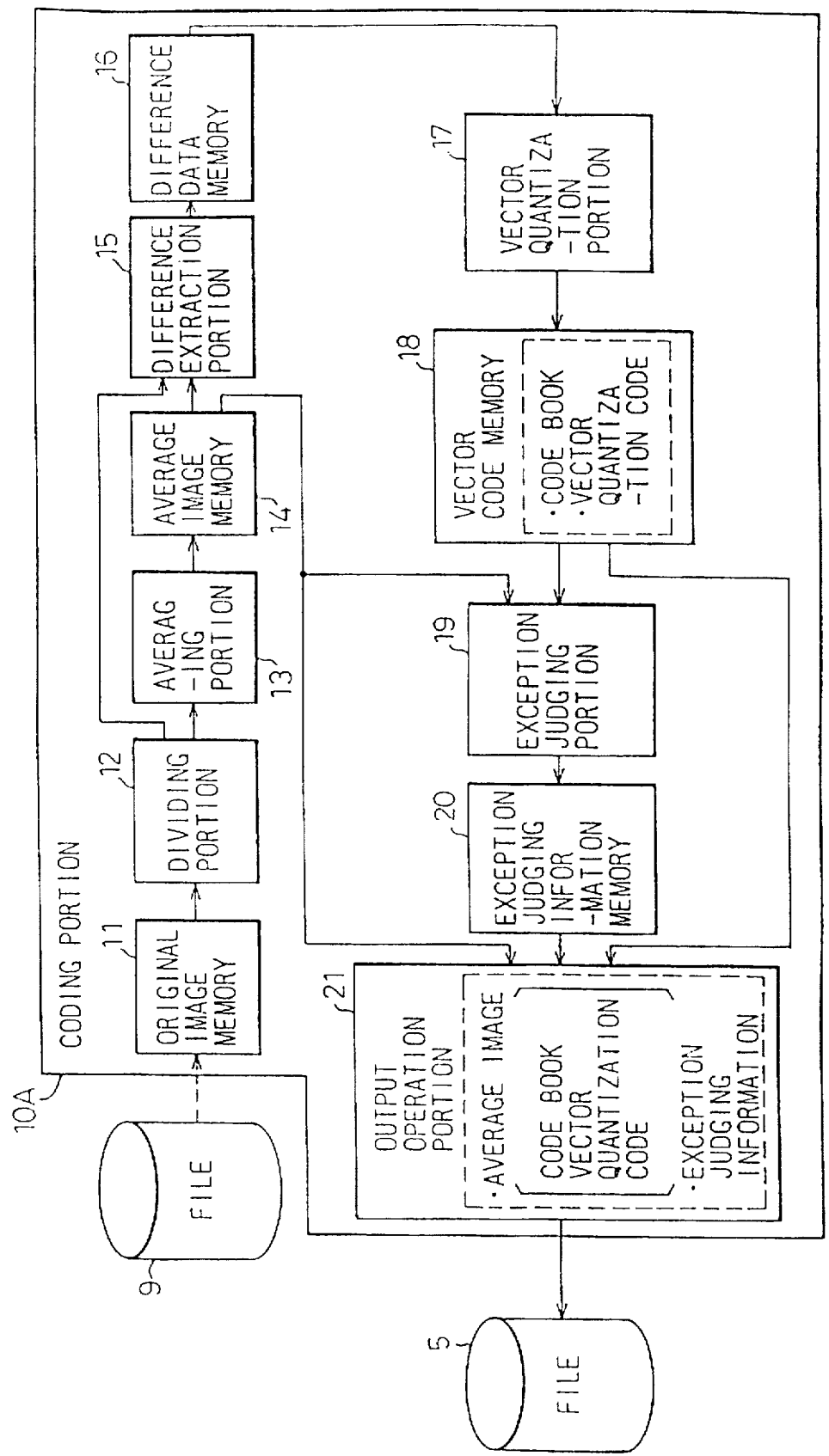
FIG. 3A is a block diagram showing a coding portion of the apparatus of FIG. 2.

FIG. 3A shows the coding portion 10A of FIG. 2. The coding portion 10A includes the file 5 for storing coded data, the file 9 for storing original images, an original image memory 11, a dividing portion 12, an averaging portion 13, an average image memory 14, a difference extraction portion 15, a difference data memory 16, a vector quantization portion 17, a vector code memory 18, an exception judgement portion 19, an exception judging information memory 20, and an output operation portion 21.

FIG. 3B shows the decoding portion 10B of FIG. 2. The decoding portion 10B includes the file 5 for storing coded data, an average image memory 14, a vector code memory 18, an exception judging information memory 20, a quantized vector decode processing portion 23, a difference data memory 25, and a difference adding portion 26. In this embodiment, the memories 14, 18, and 20 are exclusively for the decoding portion 10B. They may be shared with the coding portion 10A.

The structures and operations of the coding portion 10A and decoding portion 10B will be explained.

(a) Structure of coding portion 10A

In FIG. 3A, the coding portion 10A has the original image memory 11, dividing portion 12, averaging portion 13, average image memory 14, difference extraction portion 15, difference data memory 16, vector quantization portion 17, vector code memory 18, exception judgement portion 19, exception judging information memory 20, and an output operation portion 21.

The original image memory 11 stores an original image read out of the file 9. The original image may be a monochrome image having only luminance values, or a color image having R, G, and B values. Images stored in the file 9 are prepared by photographing objects using a video camera and converting the video signals into digital image signals in a personal computer.

The dividing portion 12 divides the original image stored in the memory 11 into blocks each containing "n×n" pixels.

The averaging portion 13 averages the values of pixels contained in each of the blocks and provides an average image of the block. Namely, the averaging portion 13 calculates an average of the values of "n×n" pixels contained in a given block and forms an average image of the block.

The average image memory 14 stores the average images prepared by the averaging portion 13.

The difference extraction portion 15 calculates, for each of the blocks, the differences between the pixels of the block and the average image of the block.

The differences are stored in the difference data memory 16.

The vector quantization portion 17 vector-quantizes the differences of each of the blocks stored in the memory 16 and prepares a vector quantization code for the block and a code book.

The code book and vector quantization codes are stored in the vector code memory 18.

The exception judgement portion 19 determines, for each of the blocks, whether or not an overflow occurs when the block is decoded, and prepares exception judging information to indicate whether or not an exceptional overflow process must be carried out when decoding the block. An overflow occurs when the value of a decoded pixel is above an upper limit or below a lower limit. The exception judging information may be a one-bit flag. The exception judgement portion 19 restores the original image of each of the blocks according to the code book, the vector quantization code for the block, and the average image of the block, and determines whether or not the decoded block causes an overflow. If the block causes an overflow, the exception judgement portion 19 sets the exception flag of the block, to indicate that an exceptional overflow process must be carried out when decoding the block.

The exception judging information, i.e., the exception flags are stored in the exception judging information memory 20.

The output operation portion 21 receives the exception judging information from the memory 20, the code book and vector quantization codes from the memory 18, and the average images from the memory 14 and prepares coded data. Accordingly, the coded data provided by the output operation portion 21 includes the average images, the code book, the vector quantization codes, and the exception judging information, i.e., the exception flags.

(b) Operation of coding portion 10A

The original image memory 11 stores an original image that may be a monochrome image involving only luminance values, or a color image involving R, G, and B values. The dividing portion 12 divides the original image into blocks each consisting of "n×n" pixels. The averaging portion 13 averages each of the blocks and forms an average image of the block. Namely, the averaging portion 13 calculates an average of the values of "n×n" pixels of each block and forms an average image of the block.

The average images are stored in the memory 14. The quantity of data of each average image is very much smaller than that of the corresponding original image. The averaging portion 13 successively forms the average images of the blocks, and the memory 14 stores the average images.

The difference extraction portion 15 calculates, for each of the blocks, the difference between each pixel contained in the block and the average image of the block. The differences are stored in the memory 16. It is possible to vector-quantize an image without calculating the differences. Calculating the differences before vector quantization, however, is a very effective method to improve a data compression ratio and the quality of a restored image because adjacent pixels in a natural image usually have like colors.

The vector quantization portion 17 vector-quantizes the differences stored in the memory 16. Blocks having like vectors are represented with the same vector quantization code. A block consisting of "2×2" pixels each having R, G, and B values is handled as a 12-dimensional vector.

Representative 12-dimensional vectors corresponding to the codes thus formed are collected into a code book. These codes are vector quantization codes. The code book and vector quantization codes are stored in the memory 18. The differences mentioned above are restored according to the code book and the vector quantization codes, and the original image is restored by adding the differences to the average images.

The restored differences are not precisely equal to the differences prepared in the coding stage because the restored differences include vector quantization errors. As a result, an overflow sometimes occurs when adding the restored differences of a given block to the average image of the block in order to restore the original image of the block. If a block causes an overflow during a decoding operation, an exceptional overflow process must be carried out to prevent the restored image of the block from being extremely different from the original image thereof. The exceptional overflow process fixes the pixel values of the restored image at an upper limit or a lower limit.

If every pixel or every block must be checked to see whether or not it causes an overflow, which rarely occurs, it adds to the decoding time.

Accordingly, the exception judgement portion 19 checks each block to see whether or not the block causes an overflow when the block is decoded and forms exception judging information according to a result of the checking. The exception judging information is stored in the memory 20.

If such checking is carried out on each pixel, it will increase the quantity of exception judging information and deteriorate a compression ratio. In addition, an overflow rarely occurs. It is advantageous, therefore, to prepare the exception judging information for each block instead of pixel.

The output operation portion 21 collects the average images from the memory 14, the code book and vector quantization codes from the memory 18 and the exceptional judging information from the memory 20 and provides coded data.

(c) Structure of decoding portion 10B

In FIG. 3B, the decoding portion 10B has the vector code memory 18, quantized vector processing portion 23, difference data memory 25, difference adding portion 26, average image memory 14, and exception judging information memory 20. The decoding portion 10B decodes data coded by the coding portion 10A. The functions of the decoding portion 10B will be explained.

The vector code memory 18 stores the code book and the vector quantization codes read out of the file 5.

The quantized vector processing portion 23 finds the differences between an original image and an average image according to the code book and vector quantization codes stored in the memory 18.

The differences are stored in the difference data memory 25.

The average image memory 14 stores an average image read out of the file 5.

The exception judging information memory 20 reads and stores, out of the file 5, exception judging information indicating whether or not an exceptional overflow process must be carried out.

The difference adding portion 26 receives the differences from the memory 25, the average image from the memory 14, and the exception judging information from the memory 20. The difference adding portion 26 adds the differences to the average image, to thereby restore an original image. At this time, the difference adding portion 26 refers to the exception judging information and determines whether or not an exceptional overflow process must be carried out. Only when required, does the difference adding portion 26 carry out the exceptional overflow process.

(d) Operation of decoding portion 10B

The quantized vector processing portion 23 prepares differences between an original image and an average image according to the code book and vector quantization codes prepared by the coding portion 10A and stored in the vector code memory 18. The differences are stored in the difference data memory 25. This process is simply carried out by looking up the code book according to the quantization code of a given block or a given pixel. Accordingly, this process is achievable, by software, at high speed.

The obtained differences, however, may include a quantization error, and therefore, they may not be equal to the differences prepared in the coding stage.

The difference adding portion 26 adds the differences stored in the memory 25 to the average image stored in the memory 14, to restore an original image. At this time, the difference adding portion 26 refers to the exception judging information stored in the memory 20.

If the exceptional judging information of a given pixel or block to be decoded indicates that the pixel or block requires no exceptional overflow process, the difference adding portion 26 simply adds the differences to the average image without carrying out the exceptional overflow process.

If the exception judging information indicates that the pixel or block needs the exceptional overflow process, the difference adding portion 26 adds the differences to the average image and, then, checks the pixel or block to determine whether the pixel or block causes an overflow, and to fix the value of the pixel or block to an upper or lower limit.

As mentioned above, the quantized vector processing portion 23 looks up the code book according to the vector quantization code of a given block, and obtains the differences between the original and average images of the block. The difference adding portion 26 adds the differences to the average image of the block, to restore the original image of the block. Whether or not the difference adding portion 26 checks an overflow of the block when restoring the original image of the block depends on existence of the exception judging information for the corresponding block.

A software program that involves the overflow checking routine involves a greater number of conditional steps such as jumps than does a software program that does not involve the overflow checking routine. This is why the embodiment of the present invention can shorten the decoding time.

(e) Details of operation of coding portion 10A

The details of the operation of the coding portion 10A will be explained.

(1) Dividing the original image into blocks FIG. 4A shows an original image, and FIG. 4B shows a block in the original image. The dividing operation of the dividing portion 12 of FIG. 3A will be explained.

The original image of FIG. 4A is a monochrome image having only luminance values. The original image consists of pixels a, b, c, d, e, f, g, h, and the like.

The original image is divided into blocks each containing "n×n" pixels. When n=2, the blocks have each 2×2=4 pixels as shown in FIGS. 4B and 4C. Namely, the block #0 has the pixels a, b, e, and f, and the block #1 has the pixels c, d, g, and h.

(2) Averaging process

FIGS. 5A and 5B explain the averaging of the monochrome image, carried out by the averaging portion 13 of FIG. 3A.

Each of the blocks is averaged. For example, an average x of the block #0 containing the pixels a, b, e, and f is calculated as follows:

$$x=(a+b+e+f)/4$$

An average y of the block #1 containing the pixels c, d, g, and h is calculated as follows:

$$y=(c+d+g+h)/4$$

where a, b, c, d, e, f, g, and h represent the values of the respective pixels.

Figures 6A, 6B, 6C, 6D:
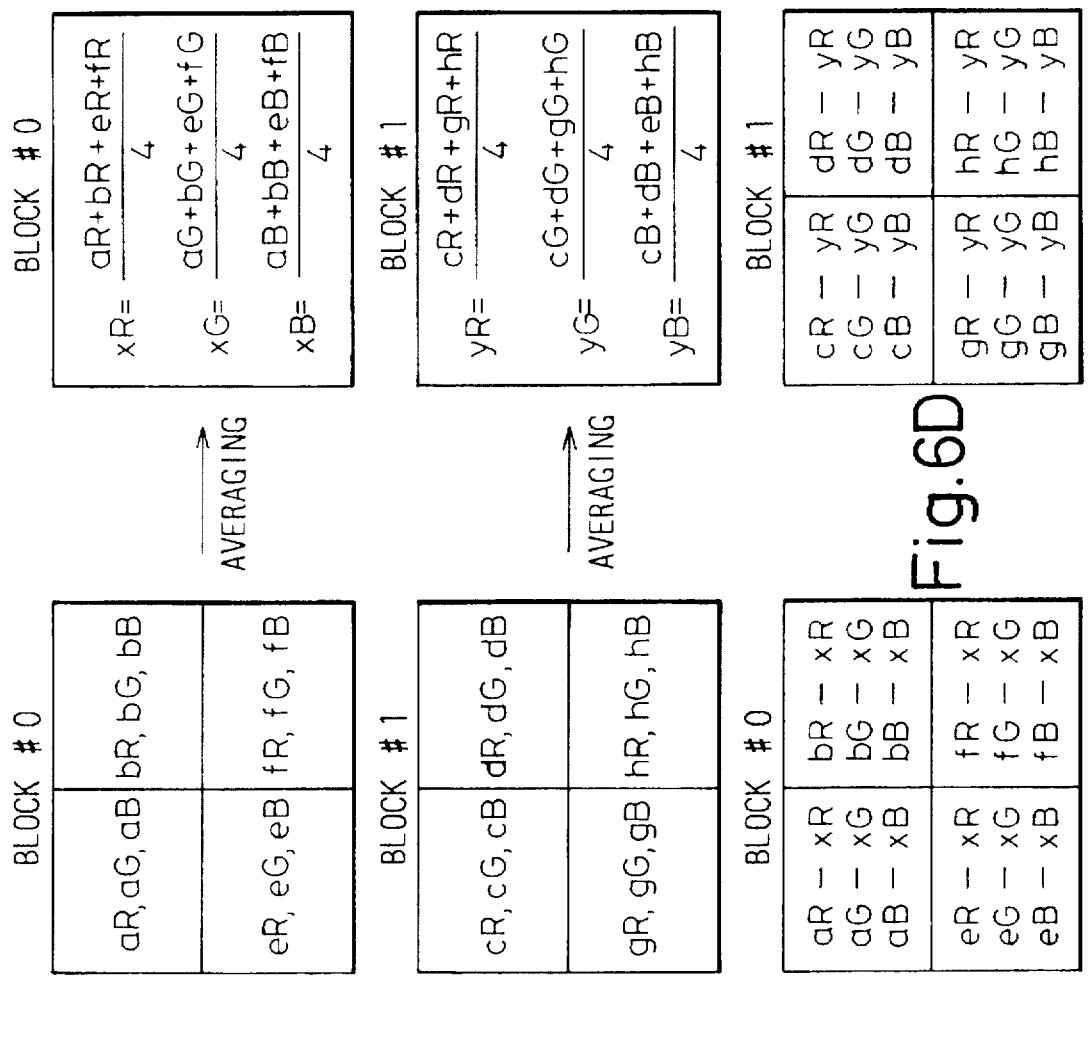
FIG. 6A shows processes of averaging the pixels of the block of FIG. 4B and forming an average image of the block when the pixels are color pixels.
FIG. 6B shows processes of averaging the pixels of the block of FIG. 4C and forming an average image of the block when the pixels are color pixels.
FIG. 6C shows the difference between each pixel in the block of FIG. 6A and the average image.
FIG. 6D shows the difference between each pixel in the block of FIG. 6B and the average image.

FIGS. 6A and 6B show the averaging of a color original image with each pixel having R, G, and B values. The color original image is divided into blocks each consisting of four pixels, and each block is averaged. Namely, the sum of pixel values of a given block is calculated color by color and is divided by the number (4) of pixels contained in the block.

In FIGS. 6A and 6B, aR, bR, eR, fR, cR, dR, gR, and hR represent the R values of the respective pixels, aG to hG represent the G values of the respective pixels, and aB to hB represent the B values of the respective pixels.

In the block #0, an average of the R values is xR, an average of the G values is xG, and an average of the B values is xB. In the block #1, an average of the R values is yR, an average of the G values is yG, and an average of the B values is yB.

These averages of the blocks #0 and #1 are calculated as follows:

$$xR=(aR+bR+eR+fR)/4$$

$$xG=(aG+bG+eG+fG)/4$$

$$xB=(aB+bB+eB+fB)/4$$

$$yR=(cR+dR+gR+hR)/4$$

$$yG=(cG+dG+gG+hG)/4$$

$$yB=(cB+dB+gB+hB)/4$$

(3) Difference extraction process

FIG. 5C explains the process of extracting differences out of the monochrome image, and FIG. 6C shows the process of extracting differences out of the color image. These processes are carried out by the difference extraction portion 15 of FIG. 3A.

FIGS. 5C and 5D show differences extracted out of the blocks #0 and #1 of the monochrome image. Each difference is calculated between each pixel in a given block and the average image of the block.

For example, differences for the pixels of the block #0 are a−x, b−x, e−x, and f−x, and differences for the pixels of the block #1 are c−y, d−y, g−y, and h−y.

In the case of the color image, differences are calculated block by block between the average image of a given block and each color value of each pixel in the block.

For example, the block #0 of FIG. 6C has the following differences:

$$(aR-xR, aG-xG, aB-xB)$$
$$(bR-xR, bG-xG, bB-xB)$$
$$(eR-eR, eG-xG, eB-xB)$$
$$(fR-xR, fG-xG, fB-xB)$$

The block #1 of FIG. 6D has the following differences:

$$(cR-yR, cG-yG, cB-yB)$$
$$(dR-yR, dG-yG, dB-yB)$$
$$(gR-yR, gG-yG, gB-yB)$$
$$(hR-yR, hG-yG, hB-yB)$$

(4) Vector quantization process

In the case of the color image, each pixel in each block has R, G, and B values, so that the differences of each block correspond to a 12-dimensional vector. Namely, the differential data made from the original image of one pixel is considered to be a group of 12-dimensional vectors. In the vector quantization operation performed by the vector quantization portion 17, approximately similar vectors among the 12-dimensional vectors are found, and these similar vectors are considered to be the same vector and are represented by one vector quantization code.

A simplest vector quantization technique will be explained.

A maximum value and a minimum value are found among elements in each vector, and the difference between the maximum and minimum values is calculated in each vector. A vector having the largest difference and a vector having the smallest difference are found, and the vectors are grouped into two groups around the vectors having the largest and smallest differences.

In each of the two groups, a maximum value and a minimum value are found among elements in each vector, and the difference between the maximum and minimum values is calculated in each vector. The group that includes the vector having the largest difference is divided into two subgroups in the same manner as mentioned above. These processes are repeated.

Each of these vector groups is represented by a code that corresponds to a representative vector. The elements of each representative vector are calculated according to the barycenters of member vectors of the corresponding group.

The representative vectors and quantization codes allocated to the representative vectors form a code book. This vector quantization technique is popular to a person with ordinary skill in the art.

The number of groups, i.e., the number of representative vectors to be formed is dependent on the quality and size of an original image. According to an experiment, an original image having 320 horizontal pixels by 240 vertical pixels each having five-bit R, G, and B values may be divided into 256 groups so that the image is represented with 256 representative vectors without deteriorating the quality of the original image. It is possible to compress the vector quantization codes according to Huffman codes. In a natural image, adjacent pixels frequently have like colors, and therefore, there are many groups represented with a zero vector. In this case, the zero vector may be represented with one bit. The vector quantization technique explained here is also applicable to monochrome images.

(5) Details of vector quantization

Figures 8A, 8B:
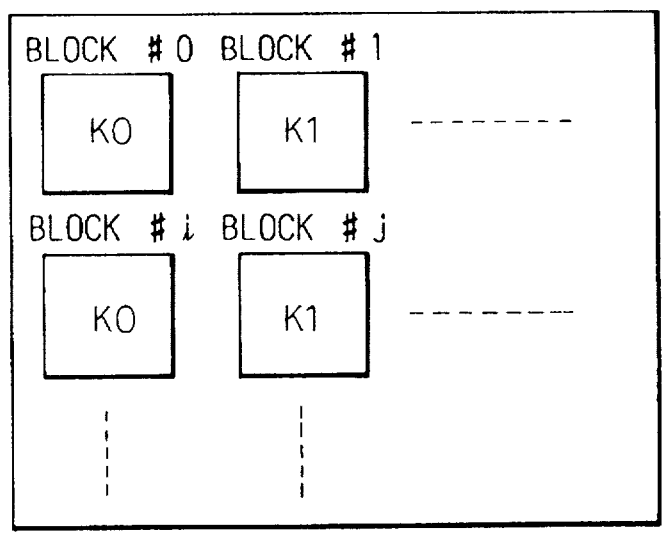
FIG. 8A shows an example of a code book prepared according to the examples of FIGS. 7A to 7D.
FIG. 8B shows vector quantization codes representing the differences of FIG. 7C, prepared according to the code book of FIG. 8A.

FIG. 7A shows a part of a monochrome image divided into blocks. The figure shows four blocks #0, #1, #i, and #j each containing four pixels. FIG. 7B shows the average images of the blocks #0, #1, #i, and #j. FIG. 7C shows differences between the data of FIGS. 7A and 7B. FIG. 7D shows a code book prepared according to the differences of FIG. 7C. FIG. 8A shows the whole of the code book of FIG. 7D. FIG. 8B shows the blocks of FIG. 7A represented with vector quantization codes listed in the code book of FIG. 8A.

The vector quantization of the monochrome image will be explained. In FIG. 7A, the block #0 contains four pixels whose values are 4, 7, 8, and 9, respectively. An average of the block #0 is (4+7+8+9)/4=7. An average of the block #1 is 5, an average of the block #i is 7, and an average of the block #j is 4.

The differences of FIG. 7C are obtained by subtracting the averages of FIG. 7B from the pixel values of FIG. 7A. For the respective pixels, the block #0 has differences of −3, 0, 1, and 2, the block #1 has differences of 3, −3, 3, and −3, the block #i has differences of −3, 2, 1, and 0, and the block #j has differences of 4, −3, 2, and −3.

These differences are vector-quantized to form the code book of FIG. 7D. The code book contains representative vectors and corresponding quantization codes.

For example, a quantization code K0 is allocated for a representative vector (a0, b0, c0, d0) corresponding to differences (−3, 1, 1, 1), and a quantization code K1 is allocated for a representative vector (a1, b1, c1, d1) corresponding to differences (4, −3, 3, −3).

According to quantization codes K0 to Kn in the code book of FIG. 8A, the differences between the blocks are expressed as shown in FIG. 8B.

(6) Exception judgement process

An exception judging process carried out by the exception judgement portion 19 will be explained. The exception judgement portion 19 restores the original image of a given block according to the average image of the block from the memory 14 and the quantization code of the block and the code book from the memory 18. At this time, the exception judgement portion 19 reads a representative vector corresponding to the quantization code of the block out of the code book.

The exception judgement portion 19 adds the average image of the block to the representative vector of the block and determines whether or not an overflow occurs. In the case of a color image, the exception judgement portion 19 adds the average image of, for example, an R component to the representative vector of the R component and determines whether or not an overflow occurs. In the case of a color image, 12 additions are made for each block.

When a result of any addition provides a value above a predetermined upper limit or below a predetermined lower limit, it is an overflow. The upper and lower limits are determined according to the bit width of a corresponding AD-converted R, G, and B value. If any one of pixels in the block in question causes an overflow, the exception judgement portion 19 sets the exception judging information of the block to indicate that the block will cause an overflow when decoded, and if it causes no overflow, resets the exception judging information of the block to indicate that no overflow will occur. The exception judging information may be a flag that is set to 1 to indicate that an overflow will occur and reset to 0 to indicate that no overflow will occur.

In this embodiment, the exception judging information is a one-bit flag, which is given to each block. If the vector quantization process rarely involves errors, i.e., if an overflow rarely occurs, the one-bit flag may be provided for a group of several blocks.

In this case, a plurality of blocks whose overflow flag is 1 must be checked one by one for an overflow. This may take a long time. However, this technique reduces the total quantity of data to be decoded and shortens the processing time as a whole. Namely, this technique improves the decoding speed.

(7) Details of the exception judging process.

Figures 9A, 9B, 9C, 9D:
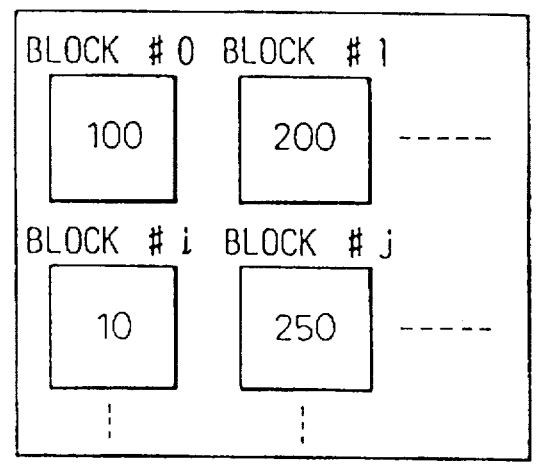
FIG. 9A shows an example of a representative vector.
FIG. 9B shows examples of average images.
FIG. 9C shows differences between the representative vector of FIG. 9A and the average images of FIG. 9B including a block that causes an overflow and a block that causes no overflow.
FIG. 9D shows exception flags corresponding to the blocks of FIG. 9C.

FIG. 9A shows an example of a representative vector, FIG. 9B shows average images, FIG. 9C shows decoded images, and FIG. 9D shows exception flags. An exception judging process will be explained with reference to these figures.

The representative vector of FIG. 9A is allocated for each of blocks #0, #1, #i, and #j. These blocks have the average images shown in FIG. 9B, respectively. The numerals shown in FIGS. 9A to 9D are only examples.

The representative vector has elements 0, +20, 0, and −20. The blocks #0, #1, #i, and #j have averages 100, 200, 10, and 250, respectively. Upper and lower limits used to determine an overflow are 255 and 0, respectively. Namely, if the value of a pixel is above 255 or below 0, it is determined that the pixel causes an overflow.

FIG. 9C shows the decoded images of the blocks #0, #1, #i, and #j, respectively. The block #0 is decoded by adding the representative vector to the average image thereof, to obtain pixel values 100, 120, 100, and 80. Accordingly, the block #0 causes no overflow, and the exception flag of the block #0 is set to 0 as shown in FIG. 9D.

The block #1 is decoded by adding the representative vector to the average image thereof, to obtain pixel values 200, 220, 200, and 180. Accordingly, the block #1 causes no overflow, and the exception flag of the block #1 is set to 0 as shown in FIG. 9D.

The block #i is similarly decoded to have pixel values 10, 30, 10, and −10. The pixel value −10 is below the lower limit 0, to cause an overflow. Accordingly, an exceptional overflow process to fix the pixel value −10 at 0 must be carried out. The exception flag of the block #i, therefore, is set to 1 as shown in FIG. 9D.

The block #j is similarly decoded to have pixel values 250, 270, 250, and 230. The pixel value 270 is above the upper limit 255, to cause an overflow. Accordingly, an exceptional overflow process to fix the pixel value 270 at 255 must be carried out. The exception flag of the block #j, therefore, is set to 1 as shown in FIG. 9D.

(8) Flow of exception judging process

Figure 10:
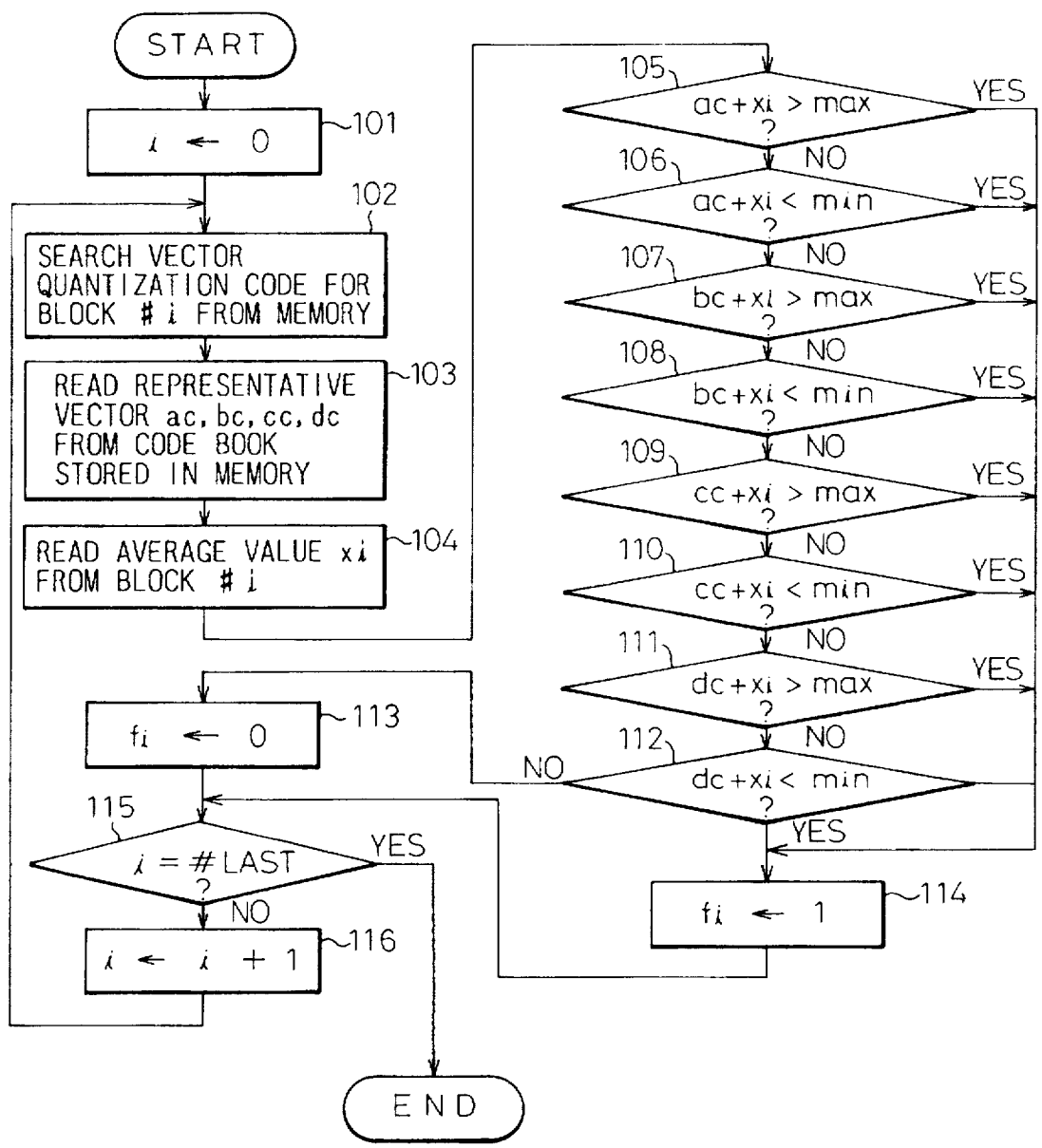
FIG. 10 is a flowchart showing the steps of preparing exception flags for blocks.

FIG. 10 is a flowchart showing the steps of determining whether or not an exception occurs. These steps are carried out in the exception judgement portion 19 of FIG. 3A. In the flowchart, i is a block number, fi is an exception flag for the block #i, max is an upper limit to cause an overflow, min is a lower limit to cause an overflow, ac, bc, cc, and dc are elements of a representative vector for the block #i, stored in a code book, and xi is an average image of the block #i.

Step 101 zeroes the block number i. Step 102 reads a vector quantization code corresponding to the block #i out of the vector code memory 18. According to the vector quantization code, step 103 reads representative vector elements ac, bc, cc, and dc out of the memory 18. Step 104 reads an average image xi out of the average image memory 14.

Steps 105 to 112 check each pixel of the block #i to see whether or not the sum of the representative vector element corresponding to the pixel and the average image causes an overflow. Namely, the step 105 determines whether or not ac+xi is above the upper limit max. If the result is negative, the step 106 determines whether or not ac+xi is below the lower limit min.

Similarly, the steps 107 and 108 determine whether or not bc+xi is out of the range between the upper and lower limits max and min. The steps 109 and 110 determine whether or not cc+xi is out of the range between the upper and lower limits max and min. The steps 111 and 112 determine whether or not dc+xi is out of the range between the upper and lower limits max and min.

If the results of the steps 105 to 112 are each negative, it is determined that no overflow occurs, and step 113 sets the exception flag fi to 0. If any one of the steps 105 to 112 provides a positive result, it is determined that an overflow occurs, and step 114 sets the exception flag fi to 1. Step 115 determines whether or not the block number i indicates the last block #LAST. If i=#LAST, the routine ends. If i≠#LAST, step 116 increments the block number i by one, and the flow returns to the step 102.

Once the last block is processed, the routine ends.

The present invention is also achievable as follows:

(1) The average image xi is a reduced original image with no compression. Accordingly, the average image xi may be coded or compressed according to, for example, a run length technique. This may further increase an image compression ratio.

(2) The vector quantization process may be carried out according to a predetermined code book, i.e., a fixed code book. In this case, the code book is stored in a memory in advance, so that there is no need for the vector quantization portion 17 to prepare a code book. The fixed code book is also used for decoding an image.

(3) The above embodiment vector-quantizes the difference between an original image and an average image. It is possible to vector-quantize the difference between an original static image and the decoded image of another static image. It is also possible to vector-quantize the difference between a frame of a dynamic image and the decoded image of another frame of a dynamic image.

In this way, an average image used in the above embodiment may be replaced with an optional reference image to carry out coding and decoding operations as mentioned above.

More precisely, the difference extraction portion 15 of FIG. 3A may extract the difference between an original image and an optional reference image. The exception judgement portion 19 restores an image according to a code book, a vector quantization code, and the difference and determines whether or not an overflow occurs.

The difference adding portion 26 of FIG. 3B refers to exception judging information and adds a difference prepared by the quantized vector processing portion 23 to the optional reference image, to restore the original image.

(4) When coding an average image, exception judging information may be provided for each block to be coded.

As explained above, the present invention provides the following effects:

(1) An original image may be vector-quantized without calculating the difference between the original image and an average image. In a natural image, adjacent pixels frequently have like colors, so that it is effective to find the difference before the vector quantization. This may reduce the quantity of data to be formed and processed.

(2) The difference between an original image and an average image is restorable if a code book and the vector quantization code of the average image are provided. The restored difference, however, includes a vector quantization error compared with the difference prepared in a coding stage. This may occasionally cause an overflow when the restored difference is added to the average image. To solve this problem, the exception judgement portion 19 determines in advance whether or not a given block will cause an overflow, which occurs only rarely, and prepares exception judging information to indicate whether or not an exceptional overflow process must be carried out when decoding the block. When decoding a coded block, the exception judging information thereof is referred to, to determine whether or not an exceptional overflow process must be carried out. Only when required, the exceptional overflow process is carried out to fix an overflowing value at an upper or lower limit value. This prevents a restored image from being extremely different from an original image and improves the decoding speed. In particular, when the image decoding operation is frequently carried out, this technique greatly improves the decoding speed.

(3) The quantized vector processing portion 23 of the decoding portion obtains the difference between an original image and an average image according to a code book and a vector quantization code stored in the vector code memory 18. Namely, the difference between the original image of a pixel or block and the average image thereof is obtainable by only looking up the code book according to the vector quantization code of the pixel or block. Accordingly, the difference extracting process is very easy to carry out and is achievable, even by software, at high speed.

(4) The coding portion 10A of FIG. 3A calculates, for each block, the difference between the original image of the block and the average image thereof or an optional reference image. The difference is vector-quantized. This technique reduces the quantity of data to be produced and the size of a code book. In addition, this technique shortens the length of each vector quantization code. Accordingly, the present invention provides a high-quality restored image even at the same compression ratio as the prior art.

(5) The present invention adds exception judging information to coded data. This improves the speed of a decoding process carried out by software as well as the quality of a restored image.

(6) The present invention forms vector quantization codes and a code book. Accordingly, the code book is always proper for an original image to be processed. Since such a code book is used for decoding coded data, a high-quality image is restored.

I claim:

1. A method of coding an original image by using vector quantization to produce a coded image, and decoding at a high speed, comprising:
   coding by
      dividing the original image into blocks, each containing a predetermined number of pixels;
      extracting a difference between each block and a reference image corresponding thereto;
      vector-quantizing the difference of each block and providing a vector quantization code for the block;
      restoring the original image of each block according to the vector quantization code and the reference image of the block;
      determining, during said restoring, whether each block causes an overflow;
      preparing, for a first block that causes an overflow, exception judging information containing first data to indicate that an exceptional overflow process must be carried out when decoding the first block, and for a second block that causes no overflow, the exception judging information containing second data to indicate that the exceptional overflow process is not needed when decoding the second block; and
      providing, as coded data for each block, the vector quantization code, the reference image, and the exception judging information of the block, and
   decoding the coded data by
      decoding the vector quantization code contained in the coded data of each block, to provide the difference between the original image and the reference image of the block;
      determining whether each block requires the exceptional overflow process according to the exception judging information contained in the coded data of the block;
      restoring the original image of each block that requires no exceptional overflow process, by adding the difference to the reference image contained in the coded data of the block; and
      restoring the original image of each block that requires the exceptional overflow process, by adding the difference to the reference image contained in the coded data of the block and carrying out the exceptional overflow process.

2. The method as claimed in claim 1, wherein the reference image of each block is an average image formed by averaging pixels contained in the block.

3. The method as claimed in claim 1, wherein said vector-quantizing of the difference of each block includes
   handling the difference of each block as a vector and representing blocks having like vectors with an identical code; and
   forming a code book that contains data corresponding to codes, and providing the codes as vector quantization codes.

4. A method of coding an original image by using vector quantization to enable decoding of the coded image at a high speed, comprising:

dividing the original image into blocks each containing a predetermined number of pixels;

extracting a difference between each block and a reference image corresponding thereto;

vector-quantizing the difference of each block and providing a vector quantization code for the block;

restoring the original image of each block according to the vector quantization code and the reference image of the block;

determining, during said restoring, whether each block causes an overflow;

preparing, for a first block that causes an overflow, exception judging information containing first data to indicate that an exceptional overflow process must be carried out when decoding the first block, and for a second block that causes no overflow, the exception judging information containing second data to indicate that the exceptional overflow process is not needed when decoding the second block; and providing, as coded data for each block, the vector quantization code, the reference image, and the exception judging information of the block.

5. The method as claimed in claim 4, wherein the reference image of each block is an average image formed by averaging pixels contained in the block.

6. The method according to claim 4, wherein said vector-quantizing of the difference of each block includes handling the difference of each block as a vector and representing blocks having like vectors with an identical code; and forming a code book that contains data corresponding to codes, and providing the codes as vector quantization codes.

7. A method of decoding coded data that has been prepared by dividing an original image into blocks, vector-quantizing each of the blocks, and including exception judging information in coded data of each block to indicate whether the block requires an exceptional overflow process, comprising:

decoding a vector quantization code contained in the coded data of each block, to provide the difference between the original image and the reference image of the block;

determining whether each block requires the exceptional overflow process according to the exception judging information contained in the coded data of the block;

restoring the original image of each block that requires no exceptional overflow process, by adding the difference to the reference image contained in the coded data of the block; and restoring the original image of each block that requires the exceptional overflow process, by adding the difference to the reference image contained in the coded data of the block and carrying out the exceptional overflow process.

8. The method as claimed in claim 7, wherein the reference image of each block is an average image formed by averaging pixels contained in the block.

9. The method as claimed in claim 7, wherein the difference of each block is vector-quantized by:

handling the difference of each block as a vector and representing blocks having like vectors with an identical code; and forming a code book that contains data corresponding to codes, and providing the codes as vector quantization codes.

10. An apparatus for coding an original image by using vector quantization to produce a coded image and decoding the coded image at a high speed, comprising:

means for dividing the original image into blocks each containing a predetermined number of pixels;

means for extracting a difference between each block and a reference image corresponding thereto;

means for vector-quantizing the difference of each block and providing a vector quantization code for the block;

means for restoring the original image of each block according to the vector quantization code and the reference image of the block;

means for determining whether each block causes an overflow when it is restored;

means for preparing, for a first block that causes an overflow, exception judging information containing first data to indicate that an exceptional overflow process must be carried out when decoding the first block, and for a second block that causes no overflow, the exceptional overflow process is not needed when decoding the second block;

means for providing, as coded data for each block, the vector quantization code, the reference image, and the exception judging information of the block;

means for decoding the vector quantization code contained in the coded data of each block, to provide the difference between the original image and the reference image of the block;

means for determining whether each block requires the exceptional overflow process according to the exception judging information contained in the coded data of the block;

means for restoring the original image of each block that requires no exceptional overflow process, by adding the difference to the reference image contained in the coded data of the block; and means for restoring the original image of each block that requires the exceptional overflow process, by adding the difference to the reference image contained in the coded data of the block and carrying out the exceptional overflow process.

11. The apparatus as claimed in claim 10, wherein the reference image of each block is an average image formed by averaging pixels contained in the block.

12. The apparatus as claimed in claim 10, wherein said vector quantization means includes:

means for handling the difference of each block as a vector and representing blocks having like vectors with an identical code; and means for forming a code book that contains data corresponding to codes, and providing the codes as vector quantization codes.

13. An apparatus for coding an original image by using vector quantization to enable decoding of the coded image at a high speed, comprising:

means for dividing the original image into blocks each containing a predetermined number of pixels;

means for extracting a difference between each block and a reference image corresponding thereto;

means for vector-quantizing the difference of each block and providing a vector quantization code for the block;

means for restoring the original image of each block according to the vector quantization code and the reference image of the block;

means for determining whether each block causes an overflow when it is restored;

means for preparing, for a first block that causes an overflow, exception judging information containing first data to indicate that an exceptional overflow process must be carried out when decoding the first block, and for a second block that causes no overflow, the exception judging information containing second data to indicate that the exceptional overflow process is not needed when decoding the second block; and means for providing, as coded data of each block the vector quantization code, the reference image, and the exception judging information of the block.

14. The apparatus as claimed in claim 13, wherein the reference image of each block is an average image formed by averaging pixels contained in the block.

15. The apparatus as claimed in claim 13, wherein said vector quantization means includes:

means for handling the difference of each block as a vector and representing blocks having like vectors with an identical code; and means for forming a code book that contains data corresponding to codes, and providing the codes as vector quantization codes.

16. An apparatus for decoding coded data that has been prepared by dividing an original image into blocks, vector-quantizing each of the blocks, and including exception judging information in coded data of each block to indicate whether the block requires an exceptional overflow process, comprising:

means for decoding a vector quantization code contained in the coded data of each block, to provide the difference between the original image and the reference image of the block;

means for determining whether each block requires the exceptional overflow process according to the exception judging information contained in the coded data of the block;

means for restoring the original image of each block that requires no exceptional overflow process, by adding the difference to the reference image contained in the coded data of the block; and means for restoring the original image of each block that requires the exceptional overflow process, by adding the difference to the reference image contained in the coded data of the block and carrying out the exceptional overflow process.

17. The apparatus as claimed in claim 16, wherein the reference image of each block is an average image formed by averaging pixels contained in the block.

18. The apparatus as claimed in claim 16, wherein each block is vector-quantized by:

means for handling the difference of each block as a vector and representing blocks having like vectors with an identical code; and means for forming a code book that contains data corresponding to codes, and providing the codes as vector quantization codes.

* * * * *